United States Patent

Lenz et al.

[11] Patent Number: 5,955,909
[45] Date of Patent: Sep. 21, 1999

[54] DEVICE FOR MONITORING CHIP TEMPERATURE

[75] Inventors: Helmut Lenz, Oberasbach; Walter Burger, Nurenberg, both of Germany

[73] Assignee: Siemens Aktiengesellschaft, Munich, Germany

[21] Appl. No.: 08/940,522

[22] Filed: Sep. 30, 1997

[30] Foreign Application Priority Data

Sep. 30, 1996 [DE] Germany .......................... 196 40 361

[51] Int. Cl.$^6$ .................................................. G06G 7/42
[52] U.S. Cl. ........................ 327/361; 327/512; 307/651
[58] Field of Search .................................. 327/355, 361, 327/512; 307/651; 374/172, 178

[56] References Cited

U.S. PATENT DOCUMENTS 5,371,470  12/1994  Jeng ........................................ 327/552
5,546,299   8/1996  Lenz ......................................... 363/71

FOREIGN PATENT DOCUMENTS 21 40 290 B2  2/1973  Germany .

Primary Examiner—Kenneth B. Wells
Assistant Examiner—Minh Nguyen
Attorney, Agent, or Firm—Hill & Simpson

[57] ABSTRACT

A device for monitoring chip temperature of a switch output stage having a switch element (100, 106) that has a first circuit (10) for generating a signal ($pv_{on}$) corresponding to the dissipated power of the switch element (100–106) during an on state. The device has a second circuit (20) for generating a signal ($pv_1$, $pv_2$; $pv'_1$) corresponding to the dissipated power of the switch element (100–106) during a turn-on and/or turn-off event. The device further has a summer (40) that sums the signals ($pv_{on}$, $pv_1$, $pv_2$; $pv_{on}$ $pv'_1$) of the first and second circuits (10, 20) in weighted fashion and outputs a sum signal ($pv_{sum}$) corresponding to the dissipated power of the switch element (100–106). The device also has an integrator (60) that responds to the sum signal ($pv_{sum}$) and outputs an output signal (th) corresponding to the chip temperature of the switch element (100–106). Such a device is suitable for temperature monitoring in realtime at switch output stages having variable switching frequency.

19 Claims, 6 Drawing Sheets

DEVICE FOR MONITORING CHIP TEMPERATURE

BACKGROUND OF THE INVENTION

The present invention is directed to a device for monitoring chip temperature of a switch output stage having a switch element. The switch output stage is formed by all switch arrangements with one or more active switch elements, particularly full-bridge arrangements (H-bridges) with four active switch elements, half-bridge arrangements with two active switch elements and arrangements having an individual active switch (for example, inductance transducer for amplification of an input voltage). In particular, the present invention is directed to switched amplifier output stages, preferably in a gradient amplifier of a magnetic resonance tomograph.

A device for monitoring chip temperature is particularly acquired in switch output stages when high powers are switched. The barrier layer temperature (or the chip temperature in a more general and simpler terms) of the switch elements is decisive for the dependable and long-lived operation of an output stage. The chip temperature must therefore be identified in realtime during operation of the switch output stage in order, for example, to be able to reduce the power or switch the output stage off when critical temperatures are reached.

DESCRIPTION OF THE PRIOR ART

In a known gradient amplifier, both the voltage as well as the switching frequency of the output stage are constant and known. For monitoring chip temperature, the actual current value here is supplied to a respective integration unit dependent on direction of current. The voltage values of the integration units correspond to the chip temperature in a respective branch of the output stage. The output stage is inhibited when one of the voltage values reaches a predetermined threshold.

However, there is the problem that the prerequisite of constant switching frequency is not met given more highly developed gradient amplifiers. When the monitoring circuit that was just described is utilized here, then it must be dimensioned for the highest switching frequency that occurs for security reasons. It then supplies excessively high dissipated power values and, thus, chip temperature values for all lower switching frequencies.

A gradient amplifier that can be operated with variable switching frequencies is disclosed, for example, in German reference DE-A1-43 04 517.

SUMMARY OF THE INVENTION

It is an object of the present invention, to provide a chip temperature monitoring device that reports an upward transgression of the allowed chip temperature (or, respectively, barrier layer temperature) in realtime and with adequate precision. That is also suitable for switch output stages having variable switching frequency.

In general terms the present invention is a device for monitoring chip temperature of a switch output stage having at least one switch element. A first circuit responds to a status signal indicating an on state of the switch element as well as to an intensity of a current signal and outputs a first signal indicative of dissipated power of the switch element during the on state. A second circuit responds to an event signal indicating at least one of a turn-on event and a turn-off event of the switch element as well as to the intensity of the current signal, and outputs a second signal indicative of dissipated power of the switch element during the turn-on event and turn-off event. A summer forms a weighted summation of the first and second signals of the first and second circuits in weighted fashion and outputs a sum signal indicative of the dissipated power of the switch element. An integrator responds to the sum signal and outputs an output signal indicative of the chip temperature of the switch element.

Advantageous developments of the present invention are as follows.

The intensity of current signal has a first sub-signal proportional to a level of the magnitude of the current flowing through the switch element and a second sub-signal proportional to a square of the magnitude of the current flowing through the switch element.

The first circuit has a first electronic analog switch that responds to the status signal and that receives the second sub-signal of the intensity of the current signal.

The first circuit further has a second electronic analog switch that responds to the status signal and that receives the first sub-signal of the intensity of the current signal.

The event signal has a first sub-signal indicating the turn-on event of the switch element and has a second sub-signal indicating the turn-off event of the switch element.

The second circuit has third and fourth electronic analog switches that respond to the first sub-signal of the event signal and that receive the first and second sub-signals of the intensity of the current signal; and wherein the second circuit has fifth and sixth electronic analog switches that respond to the second sub-signal of the event signal and that receive the first and second sub-signals of the intensity of the current signal.

The event signal is only indicative of one of the turn-on event and the turn-off event.

The second circuit has a third electronic analog switch that responds to the event signal and that receives the first and second sub-signals of the intensity of the current signals.

The second circuit has third and fourth electronic analog switches that respond to the event signal and that receive the first and second sub-signals of the intensity of the current signal.

The device further comprises one of a monoflop circuit and a flip-flop circuit that generates the event signal from the status signal.

The integrator has a voltage-current converter and a resistor-capacitor.

The resistor-capacitor circuit of the integrator has a plurality of resistors connected in series between an output of the voltage-current converter and a reference point; and wherein the resistor-capacitor circuit respectively has capacitors between terminals of the resistors and of the voltage-current converter and the reference point.

The device further comprises a comparator that compares the output signal of the integrator to a predetermined value and outputs at least one of an alarm and an error signal given upper transgression of the predetermined value.

The device is provided for a plurality switch elements. The device comprises separate first and second circuits, a summer, an integrator and a comparator for each switch element. The alarm and/or error signals of the comparators are processed to form a common output signal.

The first and second sub-signals are acquired once for a bridge circuit of switch elements and are scaled in a first summer according to dissipated power during an on state of a respective switch element of the bridge circuit and are scaled in a second summer according to dissipated power during the turn-on and turn-off events of a respective switch element of the bridge circuit.

Each switch element has a first analog, a signal scaled according to the dissipated power of the respective switch element during the on state, and a second analog switch to which is supplied a signal scaled according to the dissipated power during the turn-on and turn-off events of the respective switch element. The first analog switches are activated when the respective switch element carries current. The second analog switches are activated when a turn-on or turn-off event occurs at the respective switch element. Signals for each switch element transmitted from the first and second analog switches are summed in a respective summer.

The device further comprises a comparator that is supplied with a current signal. A direction of current signal is acquired with the comparator. Current-carrying switch elements are identified based on the direction of current signal. Respective dissipated power signals are blanked out for non-current-carrying switch elements.

The summers are respectively followed by analog switches that are only activated when a respective switch element carries current.

The device further comprises a respective AND gate that is allocated to each switch element, the respective AND gate outputting an output signal when a control signal is present for the allocated switch element and when a flow of current across the allocated switch element is relevant based on the direction of current identified with the comparator. The output signal of the respective AND gate closes a respective analog switch allocated to the allocated switch element and an event signal being triggered for the allocated switch element.

The inventive device is suitable for all types of switch output stages where in the respective switch condition the flow of current and the switched voltage are known or measured. With respect to the switch condition, a distinction is made between activated condition, deactivated condition, turn-on event (transition from the deactivated to the activated condition) and turn-off event (transition from the activated to the deactivated condition).

The basic idea of the present invention is to model the dissipated power occurring in the individual switch events and the increase in chip temperature produced as a result thereof in the form of electrical signals. The term "signal" refers not only an individual, time-dependent value, but also to a bundle of current or voltage values that are transmitted on a plurality of lines (as "sub-signals") and that can be operated to form the communicated value.

For more exact modeling of the dissipated part produced in the switch events, the insensitive current signal preferably has a first sub-signal corresponding to the amount of the intensity of the current of the current flowing through the switch element and has a second sub-signal corresponding to the square of this intensity of current.

A first circuit and a second circuit are preferably essentially composed of electronic analog switches that respond to the status or, respectively, to the event signal and respectively connect one of the sub-signals of the intensity of current signal through to the summer.

In an especially simple embodiment specifically suitable for switch output stages with MOS transistors, the dissipated power of a switch element is identified during the on state only as a function of the square of the intensity of current. Only a single, electronic analog switch is then required for the first circuit. For switch output stages having bipolar transistors or IGBTs, a second analog switch is preferably utilized that models a dissipated power component rising linearly with the intensity of current during the on state.

In a simple embodiment, a distinction between turn-on and turn-off events is not required since approximately the same dissipated power arises in both. The second circuit then need process only a single event signal exhibiting no sub-signals. This single event signal can reflect both the turn-on as well as the turn-off events, for example in the form of a respective pulse. The signal generating becomes even simpler when only the turn-on events or only the turn-off events are represented in the single event signal. The dissipated power of a turn-on event and of a turn-off event is established in the modeling for pulse of this signal. This simplification can be allowed because a noticeable increase in the chip temperature is effected only by a plurality of switch events occurring at a short time interval relative to one another but is not effected by a single switch event. For an especially exact temperature monitoring, a distinction is made between turn-on and turn-off events, preferably in that the turn-on signal exhibits two sub-signals, one sub-signal indicating the turn-on events and the other sub-signal indicating the turn-off events. As many analog switches as there are sub-signals in the intensity of current signal are preferably provided for -each of these sub-signals. In a preferred embodiment, the integrator has a voltage-to-current converter as well as a RC circuit with a plurality of resistors connected in series and capacitors connected parallel thereto. The heat capacities of the individual units of the switch element (barrier layer, chip, component housing) are modeled by the capacitors, whereas the resistors simulate the thermal resistence between these units.

A preferred embodiment of the monitoring device is provided for use in a magnetic resonance tomograph that has three switch output stages (X, Y and Z), each having four switch elements. Separate first and second circuits, summers, integrators and comparators whose alarm and/or error signals are processed into a shared output signal by a suitable circuit are provided for each of the switch elements in this embodiment.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 6:
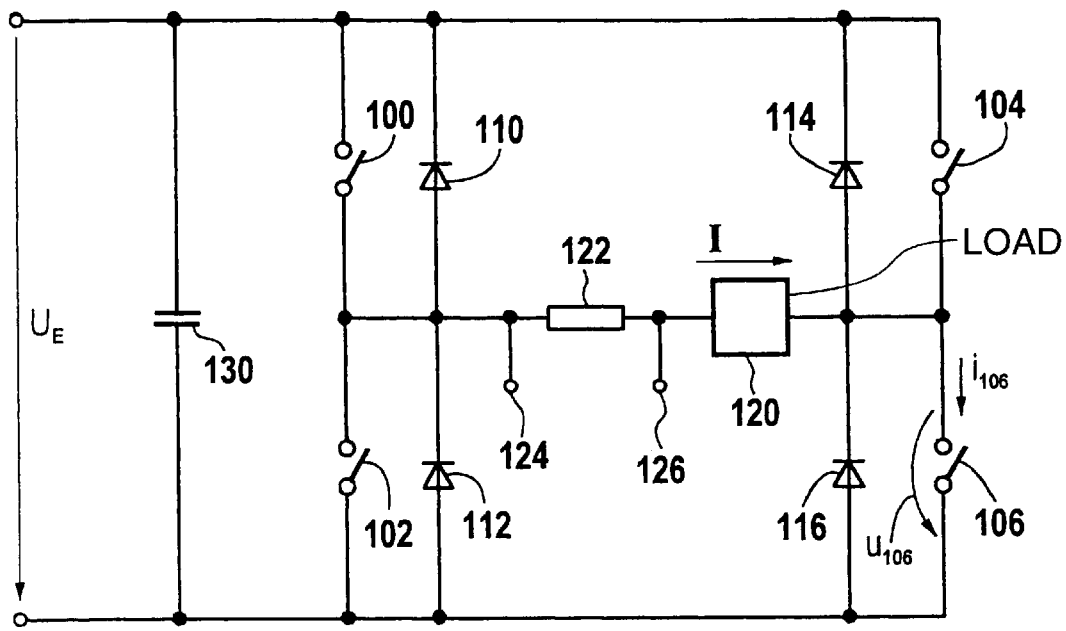
FIG. 6 is a schematic circuit diagram of a known H-bridge arrangement of a gradient amplifier.

FIG. 6 shows a known gradient amplifier with a H-bridge arrangement of four active power switch elements 100, 102, 104 and 106. Four free-wheeling diodes 110, 112, 114 and 116 are provided, these assuming the current in a known way when the switch elements 100, 103, 104 and 106 are switched off. A voltage that is proportional to the current I flowing through the load 120 can be taken at terminal points 124 and 126 of a shunt resistor 122 connected in series with the load 120. A capacitor 130 smooths a supply voltage $U_E$.

Figure 7:
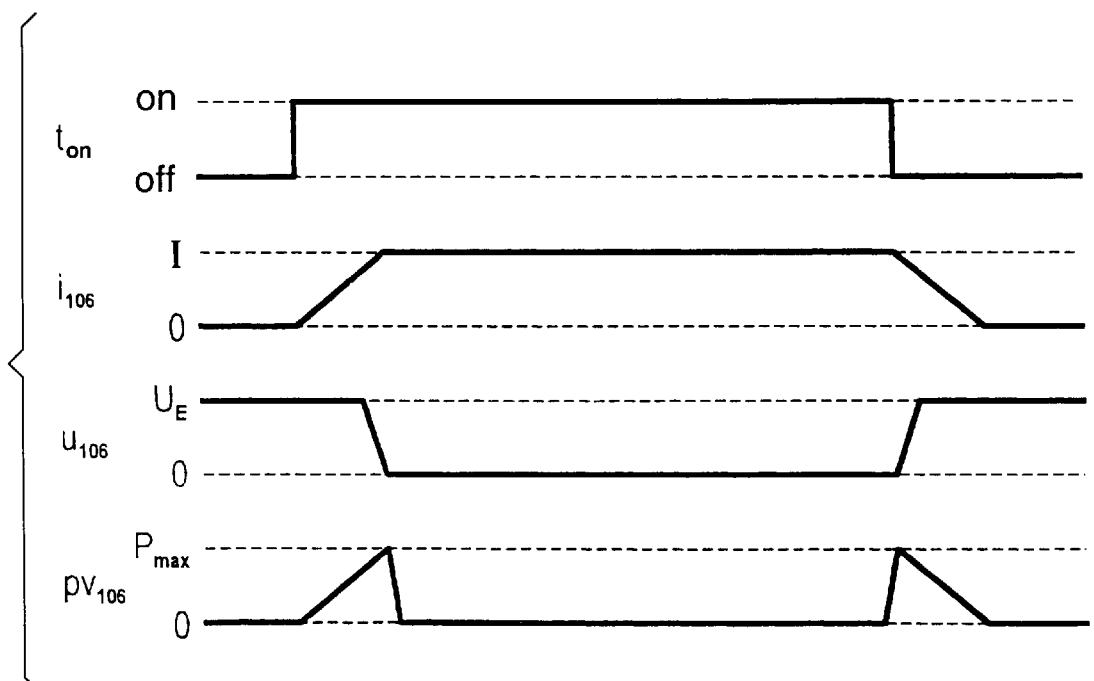
FIG. 7 is a time diagram of voltage, current and dissipated power values during operation of the circuit of FIG. 6.

FIG. 7 shows the current $I_{106}$ flowing through the switch element 106, the voltage drop $U_{106}$ at the switch element 106 and the dissipated power $PV_{106}$ converted into heat when the switch element 106 is turned on and off with the time curve $t_{on}$. In the deactivated condition, no current flows through the switch element 106, so that $I_{106}=0$ and, thus, $PV_{106}=0$ apply. A voltage produced by the inductive load 120 that inhibits the dismantling of the magnetic field from the preceding turn-on phase effects a flow of current through the free-wheeling diode 114.

A control voltage effecting a closing of the switch element 106 is now applied (positive edge of $t_{on}$) to a control input (not shown) of the switch element 106.

The switch element 106 assumes the current I previously flowing through the free-wheeling diode 114 with a finite and approximately constant current transfer rate (linearly rising value of $I_{106}$). As long as a flow current ensues through the free-wheeling diode 114 because the switch element 106 has not yet assumed the full current I, the voltage $U_{106}$ at the switch element remains constant at the value of the supply voltage $U_E$. The momentary dissipated switch power $PV_{106}$ rises steadily and achieves its peak value $P_{max}$ approximately equal to $I.U_E$. As soon as the switch element 106 has assumed the entire current I from the free-wheeling diode 114 ($I_{106}=I$), the voltage $U_{106}$ rapidly collapses from $U_E$ to a low value that is dependent on the type of switch element 106. The dissipated power $PV_{106}$ also drops quickly.

The energy $EV_1$ of a turn-on event converted into heat is:

$$\int_0^{t_1} u_{106} \cdot i_{106} dt$$

approximately valid:
ev$_1$~$U_E$ $U_E$ is constant!
ev$_1$~I I is measured.

Since the turn-on time $t_{on}$ is likewise dependent on the current I due to the constant current transfer rate, the energy ev1 of the turn-on event just described that is converted into head (given a constant supply voltage $U_E$) can be approximately expressed, with suitable constants $K_1$ and $K_2$, by:

$$ev_1 \approx K_1 \cdot |I| + K_2 \cdot I^2 \quad (1)$$

When the switch element 106 is a MOS transistor, then, in the activated condition ($i_{106}=I$), it essentially behaves like an ohmic resistor (turn-on resistance R). The dissipated power pv$_{on}$ is approximately:

$$pv_{on} \approx R \cdot I^2 \quad (2)$$

In the activated condition, by contrast, a bipolar transistor and an IGBT (insulated gate bipolar transistor) as switch element 106 exhibits a saturation voltage as well as a track resistance caused by the resistance of the bond wires and by the chip resistance. The dissipated power pv$_{on}$ in this case can be approximated, with suitable constants $K_3$ and $K_4$, by:

$$pv_{on} \approx K_3 \cdot |I| + K_4 \cdot I^2 \quad (3)$$

When the switch element 106 is turned off, the same dependencies as during turn-on analogously derive. As soon as the switch element 106 can no longer completely carry the current I flowing through the inductive load 120, the free-wheeling diode 114 assumes a part thereof. The voltage $u_{106}$ thereby rises rapidly from zero to $U_E$, whereby the dissipated power $pv_{106}$ reaches a peak $P_{max}$. In this turn-off event, an energy $ev_2$ is converted into heat that, with suitable constants $K_5$ and $K_6$, can be approximated by:

$$ev_2 \approx K_5 \cdot |I| + K_6 \cdot I^2 \quad (4)$$

During the complete turn-on cycle, the heat energy $ev_{cycle}$ thereby arises:

$$ev_{cycle} = ev_1 + t_{on} \cdot pv_{on} + ev_2 \quad (5)$$

Figure 1:
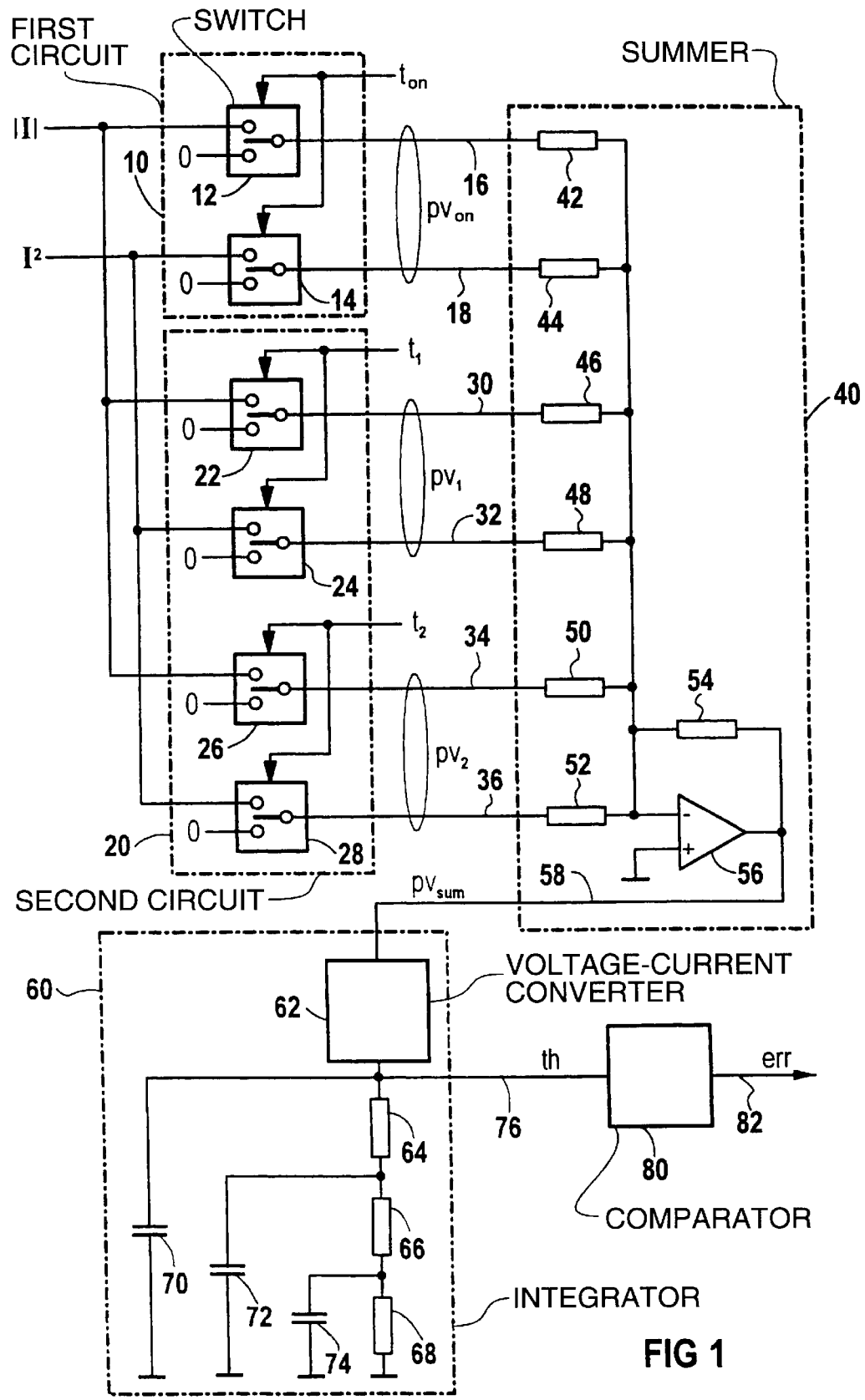
FIG. 1 is a block circuit diagram of a first embodiment of an inventive monitoring device.

A device shown in FIG. 1 for monitoring chip temperature for one of the switch elements 100, 102, 104, 106 has a first circuit 10 having two electronic analog switches 12 and 14 and has a second circuit 20 having four electronic analog switches 22, 24, 26 and 28. The switches 12, 22 and 26 are connected between a line for a signal |I| and lines 16, 30 or, respectively, 34. The switches 14, 24 and 28 are connected between a line for a signal $I^2$ and lines 18, 32 or, respectively, 36. The switches 12 and 14 are driven in common by a signal $t_{on}$. The switches 22 and 24 are driven in common by a signal $t_1$. The switches 26 and 28 are driven in common by a signal $t_2$.

A summer 40 comprises resistors 42, 44, 46, 48, 50 and 52 that are connected, to the lines 16, 18, 30, 32, 34 or, respectively, 36, and also to the negative input of an operational amplifier 56. The positive input of the operational amplifier 56 is connected to ground. The output of the operational amplifier 56 is connected to a line 58 and is also connected to the negative input via a feedback resistor 54.

The line 58 leads to the input of a voltage-current converter 62 in an integrator 60. The output of the voltage-current converter 62 is connected to ground via three series connected resistors 64, 66 and 68. A capacitor 70 is connected between ground and the junction of the resistor 64 with the current-voltage converter 62, a capacitor 72 is connected between ground and the junction of the resistors 64 and 66, and a capacitor 74 is connected between ground and the junction of the resistors 66 and 68. Further, the output of the voltage-current converter 62 is connected via a line 76 to a comparator 80 that, via a line 82, is capable of outputting an alarm and/or error signal err.

Figure 3:
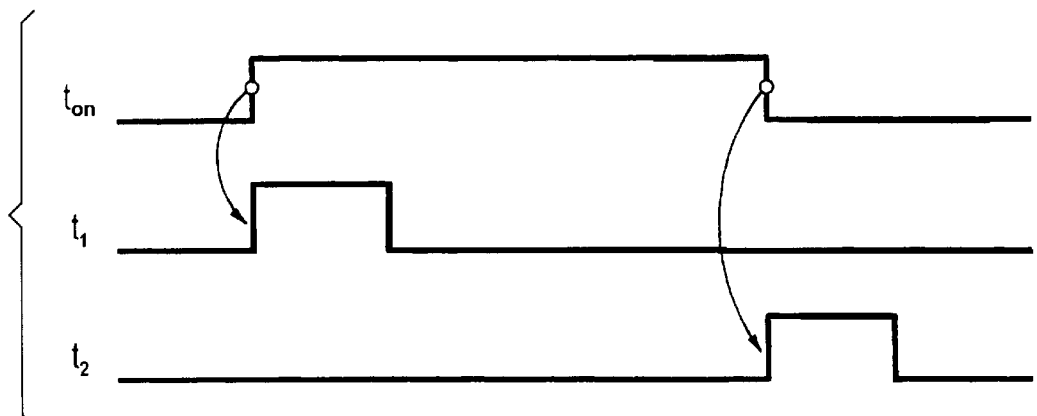
FIG. 3 is a time diagram of the status and event signals to be supplied to the circuit of FIG. 1.

During operation when, for example, it is provided for monitoring the switch element 106 (FIG. 6), the device shown in FIG. 1 is supplied with the signals $t_{on}$, $t_1$ and $t_2$ shown in terms of their time curve in FIG. 3. The status signal $t_{on}$ identifies and activated condition of the switch element 106. It essentially corresponds to the control signal for the switch element 106 and is derived from this signal. The two sub-signals $t_1$ and $t_2$ together form an event signal, whereby $t_1$ indicates a turn-on event of the switch element 106 and $t_2$ indicates a turn-off event. The sub-signals $t_1$ and $t_2$ exhibit pulses having a constant duration. Each pulse of the sub-signal $t_1$ is initiated by a leading edge of the signal $t_{on}$ and each pulse of the sub-signal $t_2$ is initiated by a trailing edge. The signals $t_1$ and $t_2$ can be generated with a known, edge-triggered monoflop, being triggered from the signal $t_{on}$. Optionally, the circuit of two flip-flops shown in FIG. 5 (described below) can also be utilized in order to generate the sub-signals $t_1$ and $t_2$ from the signal $t_{on}$.

Further, an intensity of current signal is required for the operation of the device according to FIG. 1, this being composed of the sub-signals |I| and $I^2$. The sub-signal |I| is acquired from the voltage value dropping off at the shunt resistor 122 (FIG. 6) and proportional to the current I, being acquired by forming the absolute amount (for example, by full-wave rectification). The sub-signal $I^2$ is acquired in that said voltage value is supplied to both inputs of a known analog multiplier.

During operation of the device of FIG. 1, the analog switches 12 and 14 (controlled by the status signal $t_{on}$) are closed exactly when the allocated switch element 106 is activated. During this time duration, the sub-signals |I| and $I^2$ are supplied into the summer 40 and are suitably scaled there by the resistors 42 and 44. When the signal $t_{on}$ assumes the value "off", the analog switches 12 and 14 connect the resistors 42 and 44 to a voltage value 0.

The conductance of the resistor 42 corresponds to the constant $K_3$ in equation (3), whereas the conductance of the resistor 44 corresponds to the constant $K_4$. The sub-signals transmitted to the summer 40 on lines 16 and 18 together form a signal $pv_{on}$ that corresponds to the dissipated power of the switch element 106 during its on state.

Controlled by the event sub-signal $t_1$, the analog switches 22 and 24 apply the sub-signals |I| and $I^2$ to the resistors 46 and 48 of the summer 40 for a predetermined and constant time duration at every turn-on event of the switch element 106. The conductance of the resistor 46 (with a given pulse duration of the sub-signal $t_1$) corresponds to the constant K, in equation (1), and the conductance of the resistor 48 corresponds to the constant $K_2$.

Together, the signals transmitted via the lines 30 and 32 form the signal $pv_1$ that indicates the dissipated power of the switch element 106 during the turn-on event. The pulse duration of the sub-signal $t_1$ need not agree with the actual duration of the turn-on event. The only thing important is that the energy $ev_1$ according to equation (1) converted into heat during the turn-on event corresponds to the integral of the signal value of $pv_1$ over the pulse duration of the sub-signal $t_1$.

Turn-off events of the switch element 106 are treated analogous to the turn-on events that were just described. The analog switches 26 and 28 are driven by the event sub-signal $t_2$. The switch 26 conducts the signal |I| to the resistor 50 whose conductance corresponds to the constant $K_5$ in equation (4), and the switch 28 conducts the signal $I^2$ to the resistor 28 corresponding to the constant $1/K_6$. Together, the sub-signals on the lines 34 and 36 yield the signal $pv_2$ corresponding to the dissipated power of the switch element 106 during the turn-off event.

In a known way, the summer 40 generates a sum signal $pv_{sum}$ from the input and weighted signals $pv_{on}$, $pv_1$ and $pv_2$ that corresponds to the dissipated power of the switch element 106. The resistors 42–52 and the feedback resistor 54 thereby act as a voltage divider. The output of the operational amplifier 56 assumes such a voltage level that a voltage corresponding to the ground level is adjacent at the negative input of the operational amplifier 56 as well as at the positive input thereof.

The signal $pv_{sum}$ is converted by the voltage-current converter 62 into a current that is proportional to the voltage value of the signal $pv_{sum}$. The heat resistence and heat capacitances of the individual components of the switch element 106 and of the switch output stage are modeled by the RC elements formed by the resistors 64, 66 and 68 as well as by the capacitors 70, 72 and 74. To be more precise, the resistor 64 simulates the heat resistance between barrier layer and chip of the switch element 106, the resistor 66 simulates the heat resistance between chip and housing, and the resistor 68 simulates the heat resistance between housing and cooling member. Correspondingly, the capacitor 70 models the heat capacity of the barrier layer, the capacitor 72 models that of the chip and the capacitor 74 models that of the housing. An expansion of this RC circuit by further RC elements is possible in order to more exactly simulate the structural conditions of the switch output stage.

The ground terminal of the resistor 68 is the point of reference for determining the barrier layer temperature, the cooling member temperature in this case.

The voltage at the output of the voltage-current converter 62 and dropping off at the resistors 64, 66 and 68 corresponds to the momentary temperature difference between barrier layer and cooling member of the switch element 106 and is supplied to the comparator 80 as output signal th. The comparator 80 reports a rise of the signal th above a predetermined threshold with an alarm or error signal err that is displayed to a user and/or that can be interpreted by the control electronics of the switch output stage in order to reduce the power of the switch output stage or to inhibit the output stage.

Figure 2:
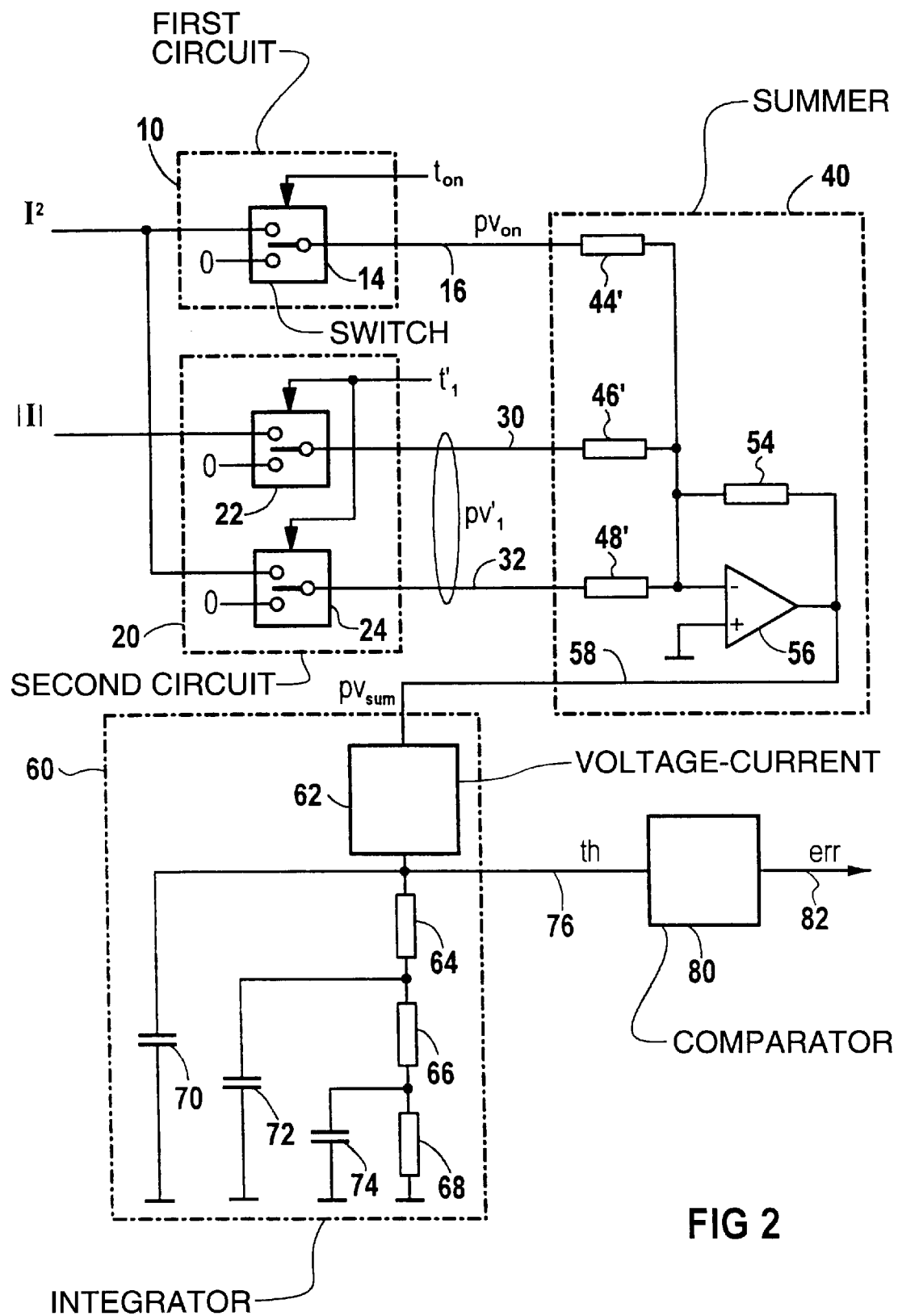
FIG. 2 is a block circuit diagram of an alternative embodiment.

Given the alternative embodiment shown in FIG. 2, both the first circuit 10 as well as the second circuit 20 are constructed more simply than in the exemplary embodiment of FIG. 1. The summer 40 comprises correspondingly fewer component parts, whereas the integrator 6 and the comparator 80 are unmodified compared to the exemplary embodiment of FIG. 1. The simplifications undertaken at the first or, respectively, the second circuit 10, 20 are independent of one another; the first circuit 10 of FIG. 1, thus, could be combined with the second circuit 20 of FIG. 2 and vise versa.

The first circuit 10 in the alternative embodiment of FIG. 2 comprises only a single analog switch 14 connected to the sub-signal $I^2$ that generates the signal $pv_{on}$ supplied to a resistor 44' of the summer 40. This simplification is possible according to equation (2) when a MOS transistor is provided as switch element to be monitored. The resistor 44' is dimensioned corresponding to the turn-on resistance R of the MOS transistor.

Figure 4:
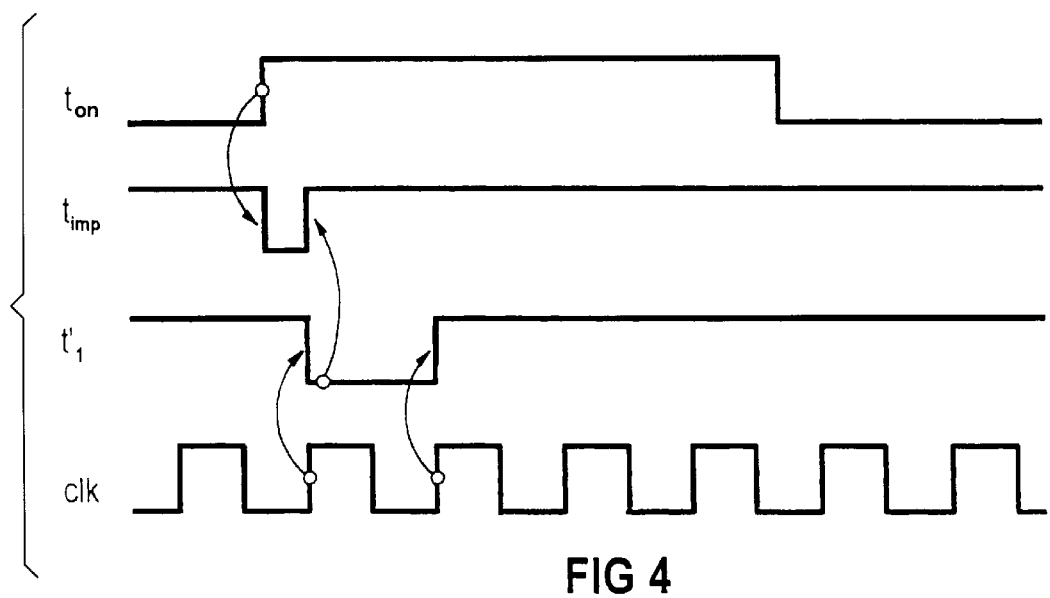
FIG. 4 is a time diagram of the status and event signals to be supplied into the circuit of FIG. 2 as well as of auxiliary signals.

The second circuit 20 in the alternative embodiment of FIG. 2 is simplified in that only a single event signal $t'_1$ is provided that, as shown in FIG. 4, indicates only the turn-on event of the allocated switch element with a pulse having a constant duration. The switches 22 and 24 respond to the signal $t'_1$ and generate a dissipated power signal $pv'_1$. The reversed polarity of the signal $t'_1$ shown in FIG. 4 compared to the signal $t_1$ of FIG. 3 is compensated either (as shown in FIG. 2) by inversion of the signal $t'_1$ or by a suitable terminal occupation of the analog switches 22 and 24.

The resistors 46' and 48' as well as the pulse length of the signal $t'_1$ are dimensioned such that the dissipated power signal $pv'_1$ for each pulse of the signal $t'_1$ corresponds to the sum of the energies $ev_1+ev_2$ converted into heat by a turn-on and a turn-off event. This circuit simplification is possible since turn-on and turn-off events always occur in pairs and follow one another so quickly that the output signal th of the integrator 60 does not fluctuate to a disturbingly great degree despite the effective halving of the event frequency.

Figure 5:
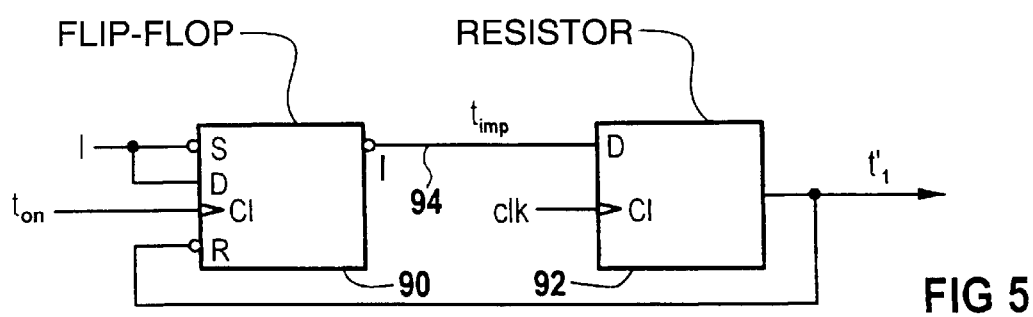
FIG. 5 is a circuit diagram of a circuit for generating the signals shown in FIG. 4.

In order to generate the signal $t'_1$ shown in FIG. 4 from the predetermined signal $t_{on}$, the circuit shown in FIG. 5 is utilized in one embodiment of the invention. A positive, edge-trigger D-flip-flop 90 is provided therein, the signal $t_{on}$, being connected to the clock input C1 thereof. The setting input S of the flip-flop 90 is deactivated and the data input D is permanently connected to the value 1. The inverting output of the flip-flop 90 is connected via a line 94 to the data input D of a positive edge-triggered D-register 92 at whose clock input C1 a predetermined and constant clock signal clk is adjacent. The non-negating output of the register 92 supplies, first, the output signal $t'_1$ and, second, is fed back to the reset input R of the flip-flop 90.

During operation of the circuit according to FIG. 5, which is shown in the time diagram of FIG. 4, a positive edge of the signal $t_{on}$ at the clock input C1 of the flip-flop 90 leads thereto that the output signal $t_{imp}$ on the line 94 assumes the value "low". This value is accepted by the register 92 with the next positive edge of the clock clk and is output as signal $t'_1$. The "low" level of the signal $t'_1$ resets the flip-flop 90 and, thus, the signal $t_{imp}$ to "high". This value is also accepted by the register 92 with the next leading edge of the clock clk.

As a result, the circuit according to FIG. 5 generates a pulse of the signal $t'_1$ for each positive edge of the signal $t_{on}$, this pulse of the signal $t'_1$ exhibiting the constant duration of a cycle of the clock clk. The fact that the pulse is generally output with a delay compared to the positive edge of the signal $t_{on}$ plays no part here.

Figure 8A:
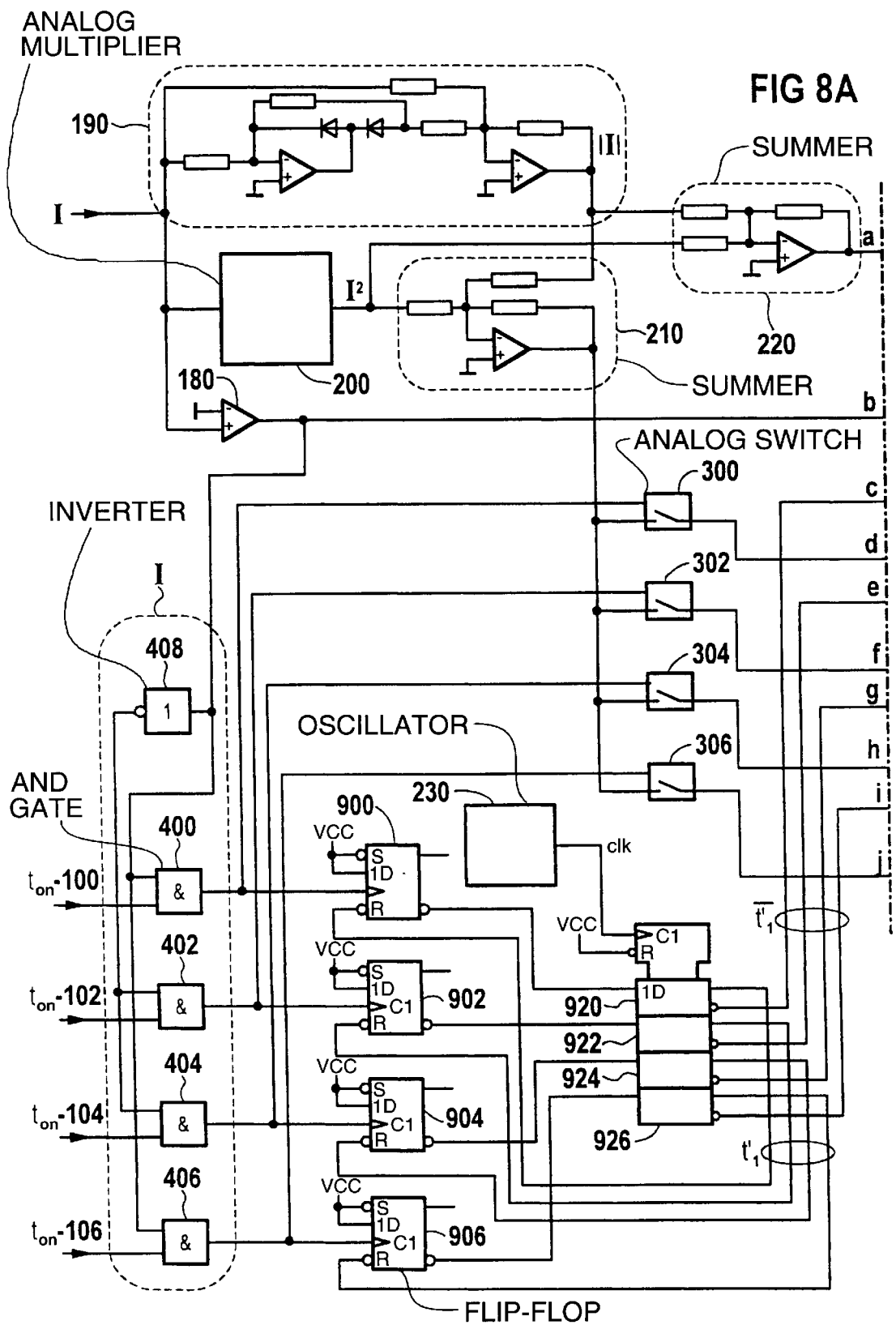
FIGS. 8A and 8B is a block circuit diagram of an advantageous embodiment of the monitoring device for a complete bridge circuit.
Figure 8B:
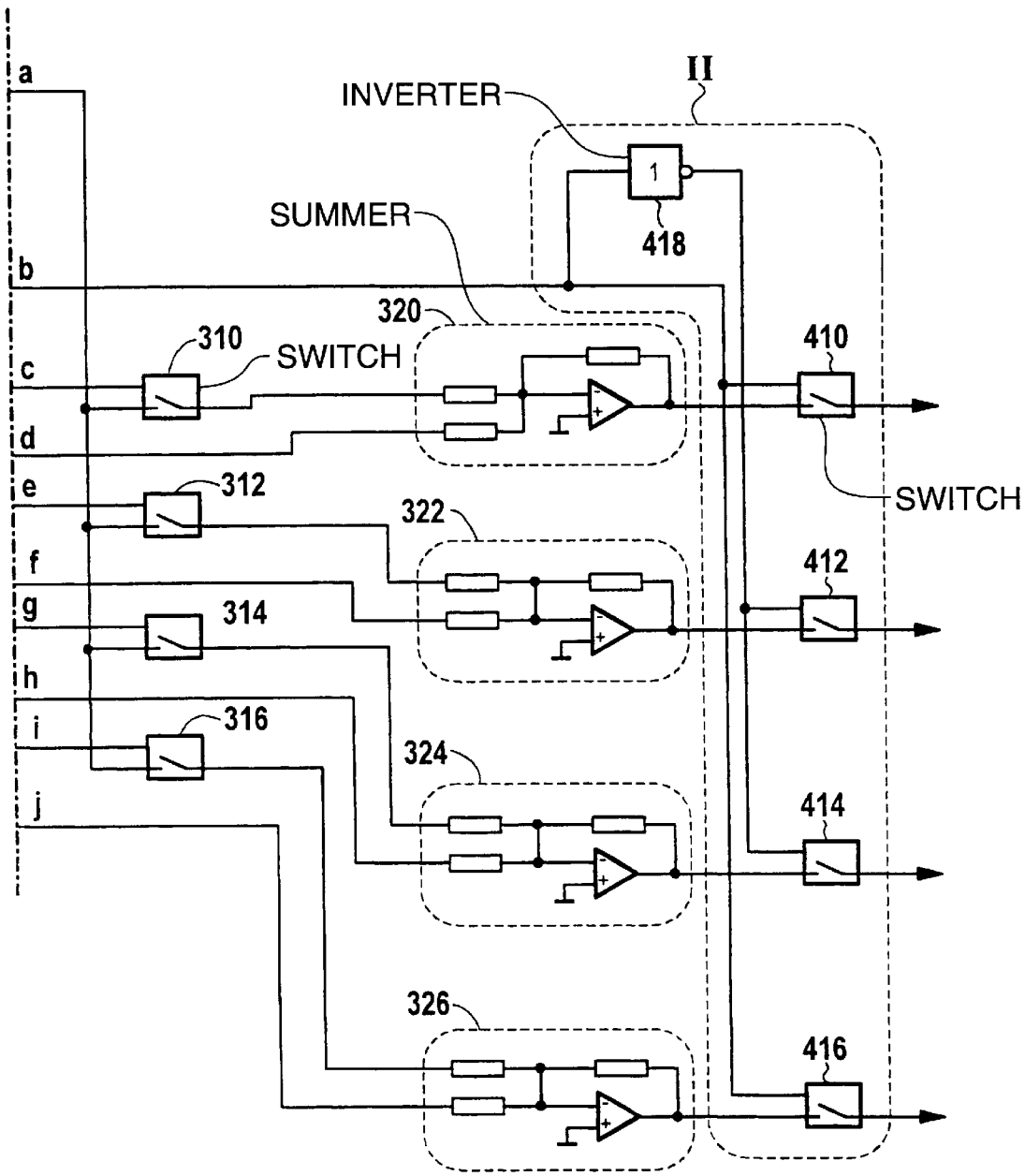

FIGS. 8A and 8B shows a simplified circuit diagram of an exemplary embodiment that is advantageously suited for monitoring a complete H-bridge according to FIG. 6.

In a known form, the current signal I is rectified by the circuit part 190 to form the signal |I|.

The square of the current intensity $I^2$ is formed by the known analog multiplier 200. Let the current signal be positive when the current I flows in the direction entered in FIG. 6. The direction of the current is identified by the comparator 180 at whose output a "high" level is assumed to penned given positive current direction.

A shared dissipated power signal is formed according to equation 3 by the summer 210 for all four switch elements 100, 102, 104, 106. The summer 220 forms a common switch energy signal according to equation (1) or, respectively, equation (4) for all four switch elements.

The signals $t_1'$ for the switch elements 100–106 are formed from the signals $t_{on}$ by D-flip-flops 900–906 and 920–926 with the assistance of the oscillator 230, as in FIG. 5.

Let the function of the circuit be explained with reference to the example of the signal path belonging to the switch 100. Leaving the function of the AND gate 400 out of consideration, the analog switch 300 becomes conductive due to the signal $t_{on-100}$ and, thus, the signal of the summer 210 is switched to the summer 320.

Due to the positive edge of the signal $t_{on-100}$, the signal pulse t' is generated according to FIG. 4 and FIG. 5, the analog switch 310 being switched conductive by this for the duration of this pulse and, thus, the signal of the summer 220 being connected to the summer 320.

The signal of the summer 210 thereby corresponds to the scaled pass losses and the signal of the summer 220 corresponds to the scaled switching losses. A further scaling is possible with the resistors of the summer 320.

In terms of function, the summer 320 corresponds to the summer 40 of FIG. 1. When the analog switch 410 is left out of consideration, then further signal processing ensues as explained in FIG. 1.

The job of the comparator 180 is to acquire the direction of the current. Given a positive current direction, only the switch elements 100 and 106 are traversed by current. The signals $P_{vsum}$ of the summers 322 and 324 must be set to zero here with the assistance of the comparator signal since no current is flowing through the switch elements 102 and 104.

Of many circuit modifications as to how the summers 322, 324 are set to the signal "0", FIGS. 8A and 8B shows two versions by way of example that can be alternatively utilized.

In a first receiver the, digital signals $t_{on}$ are weighted by AND gates 400–406 with the signal of the comparator 180 for the switches 100, 106 and the inverted signal thereof for the switches 102–104. Given a positive current direction, the signals $t_{on-100}$ and $t_{on-104}$ are blanked out here and, thus, the output signal of the summers 322 and 324 is zero.

In a second version, the analog signals $P_{vsum}$ are connected to the voltage-current converters (62 in FIG. 1) via analog switches 410–416. Given a positive current, let only the outputs of the summers 320 and 326 be through-connected to the respective voltage-current converters as a result of the comparator signal. The same is true of the summers 322 and 324 given a negative current.

Both versions are shown in FIGS. 8A and 8B. However, only one is required for this function and the respectively other can then be omitted. Further circuit modifications are obtained by: "enable" inputs at the analog switches 300–316; direct feedback of the output summers 320–326 with a respected analog switch; and distribution of the signals of the summers 210 and 220 by a respected analog "lee"-switch controlled by the comparator.

The circuit shown in FIGS. 8A and 8B (particularly with the first version) allows the monitoring to be constructed for a H-bridge with a very low outlay for analog switches, whereby a limitation to MOSFET switch elements according to FIG. 2, section 10, is not necessary here.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A device for monitoring chip temperature of a switch output stage having at least one switch element that is controlled by a control signal and that has a current signal representative of a current flowing therethrough, comprising:

a status signal that corresponds to said control signal;

an event signal derived from said status signal and that is representative of changes in said status signal;

a first circuit that responds to the status signal indicating an on state of the switch element as well as to an intensity of the current signal and that outputs a first signal indicative of dissipated power of the switch element during the on state;

a second circuit that responds to the event signal indicating at least one of a turn-on event and a turn-off event of the switch element as well as to the intensity of the current signal, and that outputs a second signal indicative of dissipated power of the switch element during the turn-on event and turn-off event;

a summer that forms a weighted summation of the first and second signals of the first and of the second circuits in weighted fashion and that outputs a sum signal indicative of the dissipated power of the switch element; and an integrator that responds to the sum signal and that outputs an output signal indicative of the chip temperature of the switch element.

2. The device according to claim 1, wherein the intensity of the current signal has a first sub-signal proportional to a level of the magnitude of the current flowing through the switch element and has a second sub-signal proportional to a square of the magnitude of the current flowing through the switch element.

3. The device according to claim 2, wherein the first circuit has a first electronic analog switch that responds to the status signal and that receives the second sub-signal of the intensity of the current signal.

4. The device according to claim 3, wherein the first circuit further has a second electronic analog switch that responds to the status signal and that receives the first sub-signal of the intensity of the current signal.

5. The device according to claim 2, wherein the event signal has a first sub-signal indicating the turn-on event of the switch element and has a second sub-signal indicating the turn-off event of the switch element.

6. The device according to claim 5, wherein the second circuit has third and fourth electronic analog switches each of which respond to the first sub-signal of the event signal, the third and fourth electronic analog switches receiving the first and second sub-signals, respectively of the intensity of the current signal; and wherein the second circuit has fifth and sixth electronic analog switches each of which respond to the second sub-signal of the event signal, the fifth and sixth electronic analog switches receiving the first and second sub-signals of the intensity of the current signal.

7. The device according to claim 2, wherein the event signal is only indicative of one of the turn-on event and the turn-off event.

8. The device according to claim 7, wherein the second circuit has a third electronic analog switch that responds to the event signal and that receives the first sub-signal of the intensity of the current signals.

9. The device according to claim 7, wherein the second circuit has third and fourth electronic analog switches that respond to the event signal and that receives the second sub-signal of the intensity of the current signal.

10. The device according to claim 1, wherein the device further comprises one of a monoflop circuit and a flip-flop circuit that generates the event signal from the status signal.

11. The device according to claim 1, wherein the integrator has a voltage-current converter and a resistor-capacitor.

12. The device according to claim 11, wherein the resistor-capacitor circuit of the integrator has a plurality of resistors connected in series between an output of the voltage-current converter and a reference point; and wherein the resistor-capacitor circuit respectively has capacitors between terminals of the resistors and of the voltage-current converter and the reference point.

13. The device according to claim 1, wherein the device further comprises a comparator that compares the output signal of the integrator to a predetermined value and outputs at least one of an alarm and an error signal given upper transgression of the predetermined value.

14. The device according to claim 13, wherein the device is provided for a plurality switch element and wherein the device comprises separate first and second circuits, summer, integrator and comparator for each switch element; and wherein the alarm and/or error signals of the comparators are processed to form a common output signal.

15. The device according to claim 2, wherein the first and second sub-signals are acquired from the intensity of the current signal in that the first and second sub-signals are acquired once for a bridge circuit of switch elements and are scaled in a first summer according to dissipated power during an on state of a respective switch element of the bridge circuit and are scaled in a second summer according to dissipated power during the turn-on and turn-off events of a respective switch element of the bridge circuit.

16. The device according to claim 15, wherein each switch element has a first analog, a signal scaled according to the dissipated power of the respective switch element during the on state, and a second analog switch to which is supplied a signal scaled according to the dissipated power during the turn-on and turn-off events of the respective switch element; wherein the first analog switches are activated when the respective switch element carries current; wherein the second analog switches are activated when a turn-on or turn-off event occurs at the respective switch element; and wherein signals for each switch element transmitted from the first and second analog switches are summed in a respective summer.

17. The device according to claim 16, wherein the device further comprises a comparator that is supplied with a current signal; wherein a direction of current signal is acquired with the comparator; and wherein current-carrying switch elements are identified based on the direction of current signal; and wherein respective dissipated power signals are blanked out for non-current-carrying switch elements.

18. The device according to claim 17, wherein the summers are respectively followed by analog switches that are only activated when a respective switch element carries current.

19. The device according to claim 17, wherein the device further comprises a respective AND gate being allocated to each switch element, said respective AND gate outputting an output signal when a control signal is present for the allocated switch element and when a flow of current across the allocated switch element is relevant based on the direction of current identified with the comparator, an output signal of the respective AND gate closing a respective analog switch allocated to the allocated switch element and an event signal being triggered for the allocated switch element.

\* \* \* \* \*